(12) United States Patent
Sato

(10) Patent No.: US 6,652,151 B2
(45) Date of Patent: Nov. 25, 2003

(54) OPTICAL CONNECTOR COUPLING END FACE STATE CONFIRMATION SCOPE AND CONFIRMATION METHOD THEREOF

(75) Inventor: Hiroshi Sato, Miyagi (JP)

(73) Assignee: Celestica Japan KK, Tokyo (JP)

( * ) Notice: Subject to any disclaimer, the term of this patent is extended or adjusted under 35 U.S.C. 154(b) by 1 day.

(21) Appl. No.: 09/893,261

(22) Filed: Jun. 27, 2001

(65) Prior Publication Data

US 2001/0055448 A1 Dec. 27, 2001

(30) Foreign Application Priority Data

Jun. 27, 2000 (JP) .......................... 2000/193377

(51) Int. Cl.$^7$ .............. G02B 6/26; G02B 6/42
(52) U.S. Cl. ........................................ 385/53
(58) Field of Search ................ 385/53, 56, 66, 385/76, 77, 38, 119, 121, 117, 134, 139; 356/241.1

(56) References Cited

U.S. PATENT DOCUMENTS

| | | | | |
|---|---|---|---|---|
| 4,212,537 A | * | 7/1980 | Golob et al. | 356/73.1 |
| 4,281,929 A | * | 8/1981 | Lord et al. | 356/241.1 |
| 5,104,391 A | * | 4/1992 | Ingle et al. | 250/227.15 |
| 5,415,158 A | * | 5/1995 | Barthel et al. | 600/149 |
| 5,868,665 A | * | 2/1999 | Biggs | 600/112 |
| 5,940,559 A | * | 8/1999 | Noll | 385/53 |
| 6,501,551 B1 | * | 12/2002 | Tearney et al. | 356/477 |

* cited by examiner

Primary Examiner—Robert H. Kim
Assistant Examiner—Richard Kim
(74) Attorney, Agent, or Firm—Dickstein, Shapiro, Morin & Oshinsky, LLP

(57) ABSTRACT

A probe 19 illuminates and enlargingly images the coupling end face of the optical connector 1a. An attachment 2 disposes the coupling end face of the optical connector 1a on the optical axis of the probe 19 and causes the coupling end face of the optical connector to be focused in a position inside the probe. A monitor unit 20 monitors the image of the state of the coupling end face of the optical connector 1a obtained by enlarging imaging by the probe 19.

16 Claims, 5 Drawing Sheets

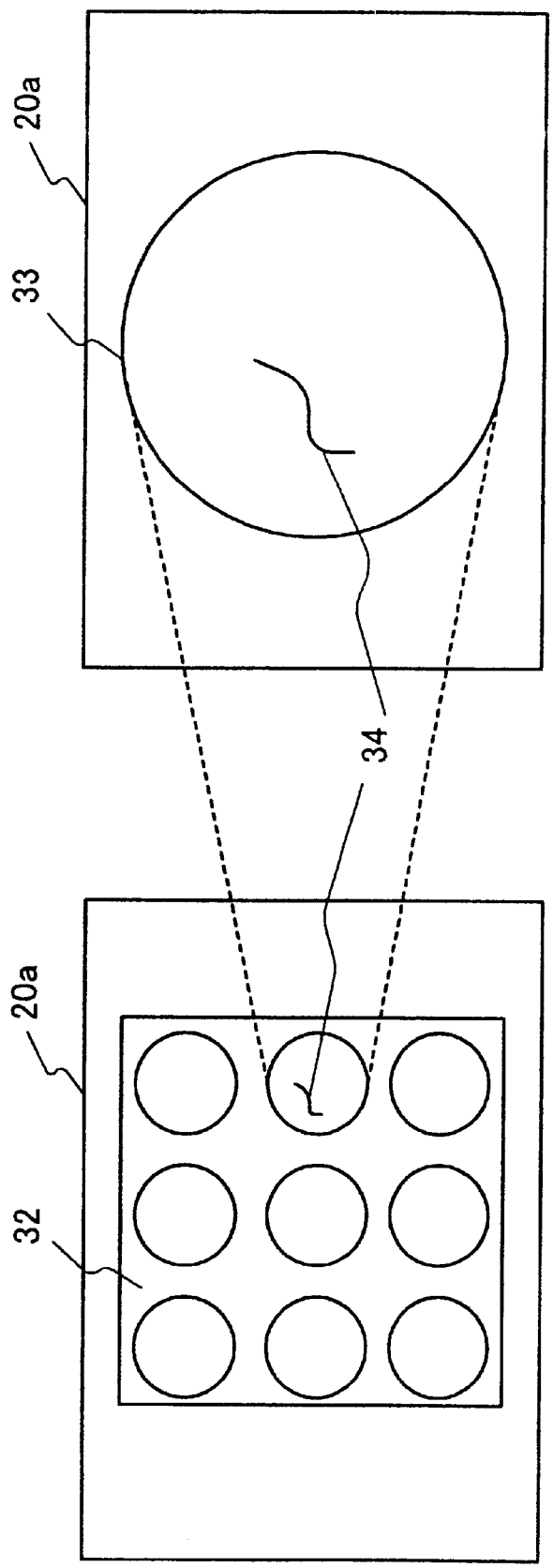

OPTICAL CONNECTOR COUPLING END FACE STATE CONFIRMATION SCOPE AND CONFIRMATION METHOD THEREOF

BACKGROUND OF THE INVENTION

This application claims benefit of Japanese Patent Application No. 2000-193377 filed on Jun. 27, 2000, the contents of which are incorporated by the reference.

The present invention relates to optical fibers used for light transmission paths and, more particularly, to optical connector (coupler) coupling end face state confirmation scope and optical connector coupling end face state confirmation method for confirming the state of the coupling end face of an optical connector optically coupled with an optical fiber.

An optical fiber used for an optical transmission path is optically coupled by an optical connector. The optical connector is accommodated in an optical connector housing, which may have various shapes depending on the shape of the optical connector. Recent optical fibers required for light transmission have core portions which are extremely reduced in diameter from about 10 µm or below.

In an optical connector for optically coupling two optical fibers, the axial alignment of the optical fibers is made such that the core portions thereof are coupled together in an overlap relation to each other for preventing coupling loss. Also, since the core portion is small in diameter, even very small foreign particles present at the end face of the core portion to be optically coupled, enhances the coupling loss. For this reason, in addition to the axial optical fiber alignment, usually the core portion coupling end face of the optical connector is cleaned by inserting a thin cleaning tool such as a cotton bar. In this way, the end face of the core portion should be held free from any foreign matter.

However, in the prior art in which the core portion coupling end face of the optical connector is cleaned with a cotton bar or the like, the following problems are posed. For example, first problem is that foreign matter such as yarn pieces may be generated by the cleaning tools such as the cotton bar itself. Unless the generation of the foreign matter such as yarn pieces is found out, the foreign matter remains and is not perfectly removed, thus posing again the problem of the coupling loss increase. A second problem is that scars and scratches on the core portion due to unsatisfactory handling of the optical connector poses the problems of coupling loss increase and so forth. Unless such scars and scratches are found out, they remain on the coupling end face of the optical connector, and are not perfectly removed. Like the first problem, again this poses the problem of coupling loss increase. A third problem is that when such problem as coupling loss increase arises on the coupling end face of the optical connector in the optical transmission path, it is difficult to pin-point an optical connector as the cause of the problem among a plurality of optical connectors.

In other words, the common cause of the above problems resides in that it is impossible to confirm the state of the coupling end face of the optical connector.

SUMMARY OF THE INVENTION

The present invention was made in view of the above problems, and it has an object of providing an optical connector coupling end face state confirmation scope and an optical connector coupling end face state confirmation method, which permit ready confirmation of the state of the coupling end face of the optical connector and ready confirmation of foreign matter and scars and scratches on the core portion.

According to an aspect of the present invention, there is provided an optical connector coupling end face state confirmation scope comprising: a probe for illuminating and enlargingly imaging the coupling end face of the optical connector; an attachment for disposing the coupling end face of the optical connector on the optical axis of the probe and causing the coupling end face of the optical connector to be focused in a position inside the probe; and a monitor unit for monitoring the image of the state of the coupling end face of the optical connector obtained by enlarging imaging by the probe. With this means, it is possible to confirm the state of the coupling end face of the optical connector, readily confirm foreign matter and scars, etc. on the optical fiber core portion and prevent coupling loss increase.

The attachment has a shape corresponding to the shape of an optical connector housing accommodating the optical connector. With this means, it is possible to cope with various optical connectors and optical connector housings by changing the attachment.

The attachment has a guide hole with the probe inserted therein, the guide hole being formed such as to fit the outer diameter of the probe. With this means, it is possible to dispose the coupling end face of the optical connector on the optical axis of the probe.

The distance between the coupling end face of the optical connector disposed in the attachment and an objective lens disposed inside the probe is set to a predetermined value such as to have the coupling end face of the optical connector be fixed in a position inside the probe. With this means, the coupling end face of the optical connector can be optically enlargingly imaged by the objective lens.

The probe includes a light-emitting diode for illuminating the coupling end face of the optical connector and a half mirror for reflecting light emitted from the light-emitting diode at an angle of 90 degrees toward the coupling end face of the optical connector and transmitting light reflected by the coupling end face of the optical connector to have an image of the coupling end face of the optical connector be focused in a position within the probe. With this means, the coupling end face of the optical connector is illuminated by the light-emitting diode.

A light absorbing sheet is applied to the inner surface of the probe at a position thereof, on which light emitted from the light-emitting diode and transmitted through the half mirror is incident. With this means, it is possible to eliminate adverse effects of an image which is otherwise formed on the inner surface of the probe by light emitted from the light-emitting diode and transmitted through the half mirror on the image of the coupling end face of the optical connector.

The probe includes a holder, to which an imaging element for imaging the coupling end face of the optical connector is secured, a guide for guiding the straight movement of the holder for moving the imaging element along the optical axis of the probe and a slide for giving a drive force to the holder for straight movement of the guide. The focus position may vary slightly depending on the kind of the optical connector and optical connector housing and also by manufacturing fluctuations of the attachment and other components. With the above means, it is possible to accurately adjust the position of the coupling end face of the imaging element to the focus position.

The slider has hook means for transmitting a drive force therethrough to the holder, the hook means being separated from the holder and the guide. With this means, when manually causing the sliding operation of the slide, the stress generated in the slide in a direction perpendicular to the sliding direction is not applied to the holder, and it is possible to obtain stable straight movement of the slide.

The hook means of the slide has a plate-like portion for preventing external scattered light from entering from a guide groove for guiding the straight movement of the slide. With this means, intrusion of external scattered light is prevented, and it is thus possible to prevent deterioration of the light image on the coupling end face of the optical connector.

The coupling end face of the optical connector is the coupling end face of a single-core optical connector or the coupling end face of a multiple-core optical connector. With this means, it is possible to apply the present invention not only to single-core optical connectors but also to multiple-core optical connectors.

According to another aspect of the present invention, there is provided an optical connector coupling end face state confirmation apparatus comprising means for illuminating and enlargingly imaging the coupling end face of the optical connector, and means for monitoring the image obtained by the enlarging imaging of the coupling end face of the optical connector.

According to other aspect of the present invention, there is provided an optical connector coupling end face state confirmation method comprising: a step of illuminating and enlargingly imaging the coupling end face of the optical connector; and a step of monitoring the image obtained by the enlarging imaging of the coupling end face of the optical connector. With this means, like the above-mentioned case, it is possible to confirm the coupling end face of the optical connector, readily confirm foreign matter and scars and scratches of the optical fiber core portion and prevent coupling loss increase.

Other objects and features will be clarified from the following description with reference to attached drawings.

BRIEF DESCRIPTION OF THE DRAWINGS

FIGS. 5A and 5B show a different example of display as a modification of the example shown in FIG. 4.

PREFERRED EMBODIMENTS OF THE INVENTION

Preferred embodiments of the present invention will now be described with reference to the drawings.

Figure 1:
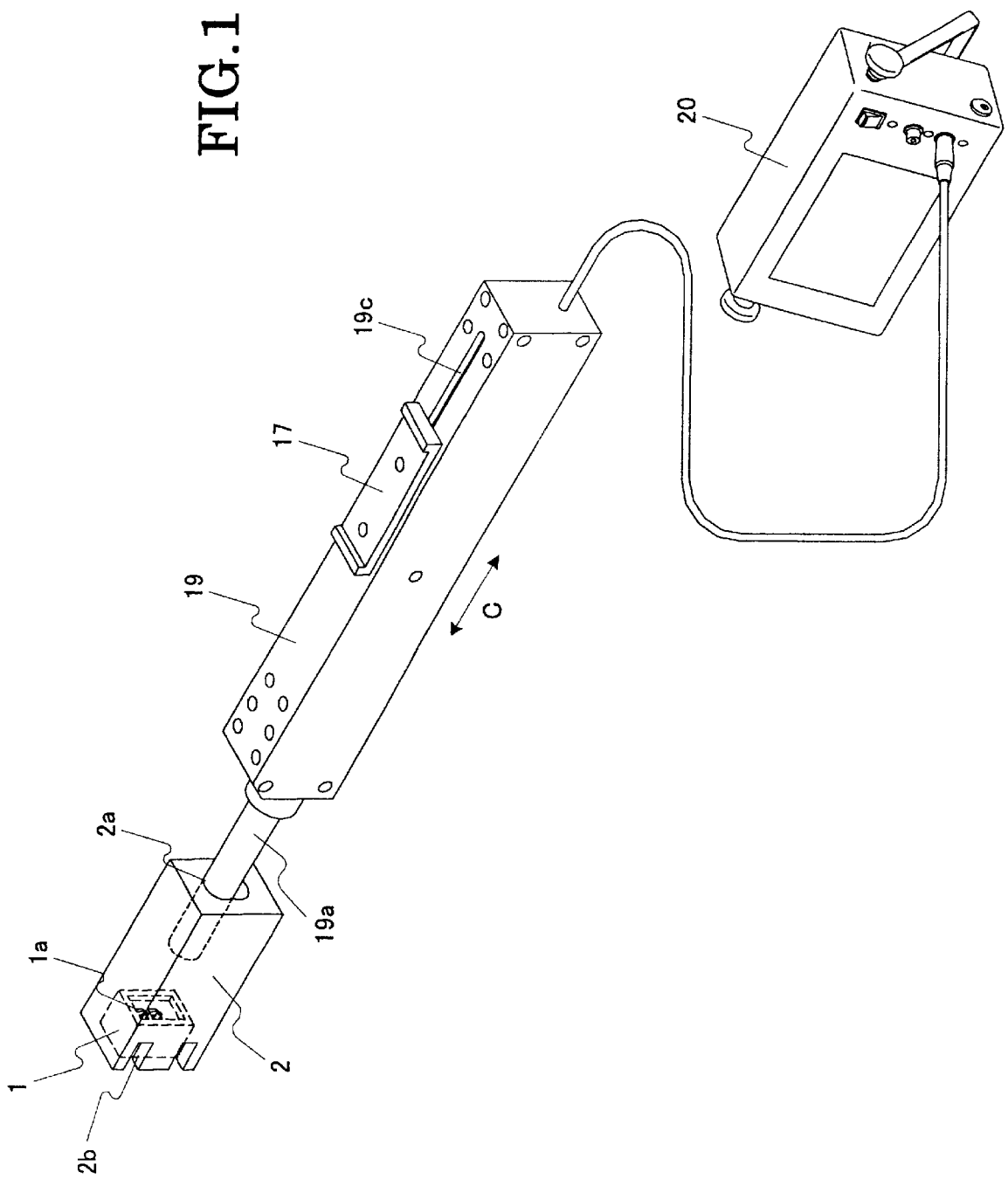
FIG. 1 is a perspective view showing the general construction of the optical connector coupling end face state confirmation scope according to the present invention.

FIG. 1 is a perspective view showing the general construction of the optical connector coupling end face state confirmation scope according to the present invention.

As shown in the Figure, the illustrated scope comprises a probe 19, an attachment 2 and a monitor unit 20. The probe 19 has an optical enlarging function, an illuminating function and an image output function provided by an imaging element, these functions being provided on its optical axis.

The probe 19 has a distal tube 19a provided at one end. The attachment 2 has a guide hole 2a provided at one end and an opening 2b provided at the other end. An optical connector housing 1 accommodating an optical connector is fitted in the opening 2b of the attachment 2.

The distal tube 19a of the probe 19 is inserted in the guide hole 2a of the attachment 2. Inside the attachment 2, the inserted end face of the distal tube 19a and the coupling end face of an optical connector 1a in the fitted optical connector housing 1 face each other, and the coupling end face of the optical connector 1a can be observed from the probe 19. Inside the attachment 2, the coupling end face of the optical connector 1 is disposed on the optical axis of the probe 19 and held at a predetermined distance.

The probe 19 supports a slider 17, and has a guide groove 19c. The slider 17 supports the imaging element mounted on it, and it is movable along the guide groove 19 for imaging element position adjustment. The monitor unit 20 is connected to the probe 19, and with the image output function of the imaging element it displays an enlarged image of the coupling end face of the optical connector 1a in the optical connector housing 1. The attachment 2 is simple in shape, and thus it can be readily manufactured in shape suited to the shape of the optical connector housing 1. Thus, it is possible to comply with various shapes of the optical connector housing 1.

Figure 2:
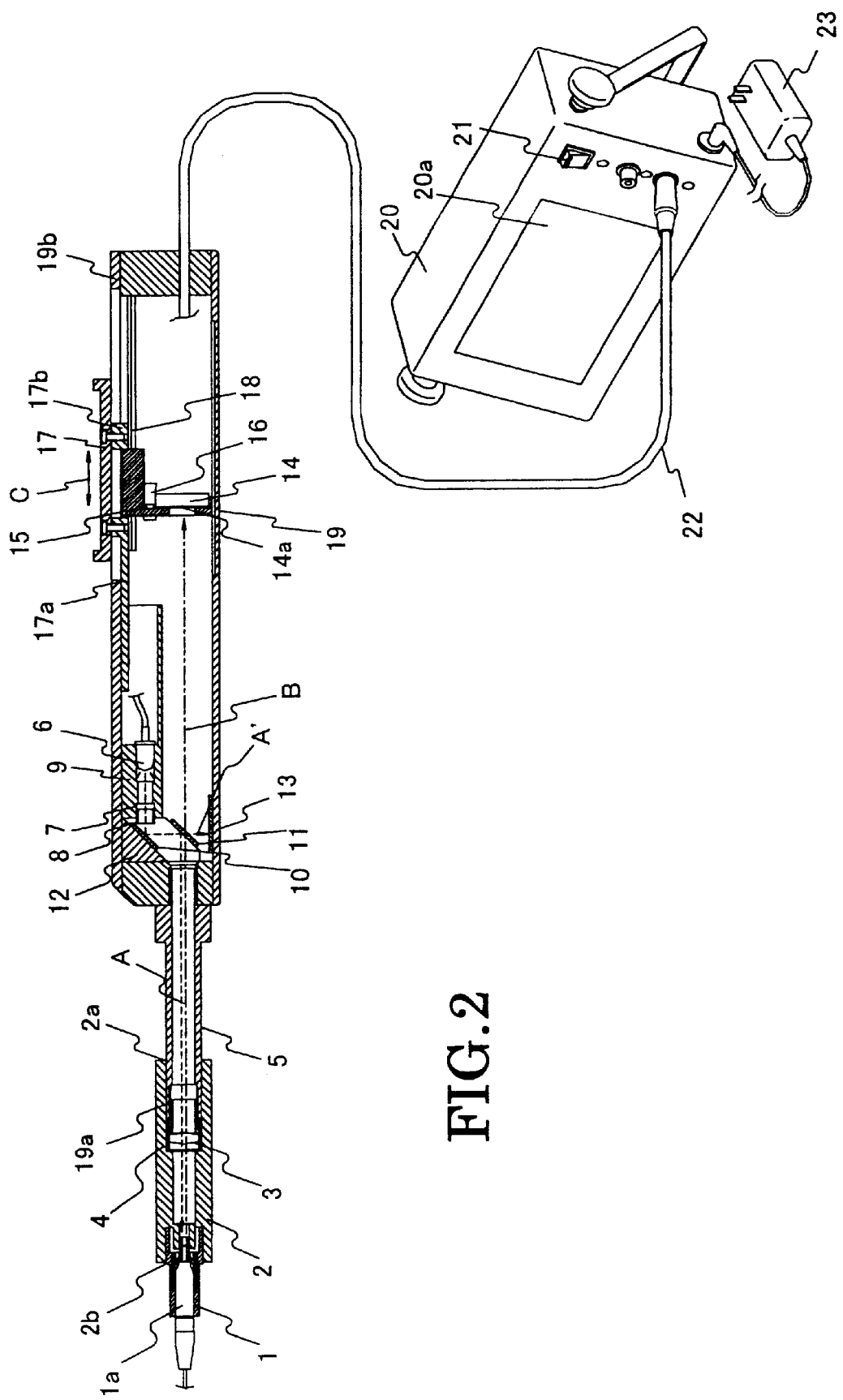
FIG. 2 is a sectional view showing the construction of the probe 19 show in FIG. 1.

FIG. 2 is a sectional view showing the construction of the probe 19 show in FIG. 1. As shown in the Figure, an objective lens 3, a half mirror 11 and an imaging element 14 are disposed on the optical axis of the probe 19. The distal tube 19a of the probe 19 inserted in the attachment 2, accommodates an inner tube member 5 having morror inside surfacen. Inside the member 5 are provided with the objective lens 3 for enlarging the image of the coupling end face of the optical connector 1a in the optical connector housing 1 and a holder 4 with the lens 3 secured thereto. For the disposition of the coupling end face of the optical connector 1 on the optical axis of the probe 19, the guide hole 2a of the attachment 2 is designed such as to fit the outer shape of the distal tube 19a with the center of the coupling end face of the optical connector 1a as an axis. Inside the probe 19, a lamp frame 9 is provided, which accommodates a light-emitting diode (LED) 6, a converging lens 7 and a collar 8. These components are mounted inside the probe 19.

The LED 6 illuminates the coupling end face of the optical connector 1a in the optical connector housing 1 via the inner tube member 5 and the objective lens 3. The converging lens 7 is disposed adjacent to the light emission face of the LED 6, and it converges light emitted therefrom. The LED 7 is secured to the collar 8. Inside the probe 19, a bracket 12 is provided, on which a mirror 10 is mounted together with the half mirror 11. The mirror 10 is disposed adjacent to the converging lens 7, and reflects converged light from the converging lens 7 by an angle of 90 degrees. The half mirror 11 reflects the light from the mirror 10 by an angle of 90 degrees toward the coupling end face of the optical connector 1a, and also transmits the light reflected by the coupling end face of the optical connector 1a and incident via the objective lens 3. Light reflected by the half mirror 11 reaches the coupling end face of the optical connector 1a as shown by arrow A.

A light absorbing sheet 13 is applied to the inner surface of the probe 19 facing the mirror 10 via the half mirror, and absorbs light upwardly transmitted through the half mirror 11. The sheet 13 thus serves to prevent the transmitted light from being reflected by the inner surface of the probe 19 toward the imaging element 14 to be described later via the half mirror 11. More specifically, the half mirror 11 splits the light incident from the mirror 10 into light beams led in the directions of arrows A and A'. The light absorbing sheet 13 serves to prevent the light beam in the direction of arrow A' from being reflected by the inner surface of the probe 19 and then by the half mirror 11 to have adverse effects on the image.

The probe 19 has, in addition to the imaging element 14 which converts an image light beam from the objective lens 3 to an image, a holder 15 with the imaging element 14 secured thereto, a claw 16, a slider 17 for causing straight movement of the holder 15 in the directions of arrow C and a guide 18 for providing straight movement as movement of the holder 15 caused by the slider 17, these components being mounted in it. The imaging element 14 may be a charge-coupled device (CCD). The image of the coupled end face of the coupling end face of the optical connector housing 1, which is illuminated by the light incident on the coupling end face of the optical connector 1a in the housing 1, is optically enlarged by the objective lens 3, and led through the half mirror 11 as shown by arrow B to be focused on an imaging face 14a of the imaging element 14.

The extent of insertion of the distal tube 19a in the guide hole 2a of the attachment 2, i.e., the distance between the coupling end face of the optical connector 1a and the objective lens 3, is held at a predetermined value such that the image of the coupling end face of the optical connector 1a is focused on the imaging face 14a of the imaging element 14. The imaging element 14 is electrically connected by a cable 22 to the monitor unit 20. The monitor unit 20 has a display screen, on which image signal outputted from the imaging element 14 is displayed. The monitor unit 20 is furnished with power from a power supply plug 23. By turning on a power supply switch 21, power voltage is supplied to the unit 20, and is also supplied via the cable 22 to the LED 6 and the imaging element 14.

The focus position may slightly vary depending on the kind of the optical connector 1a and manufacturing fluctuations of the attachment and other components. In such a case, it is possible to adjust the imaging face 14a of the imaging element 14 to the focus position by manually moving the slider 17 back and forth as shown by arrow C. This will now be described in detail.

Figure 3:
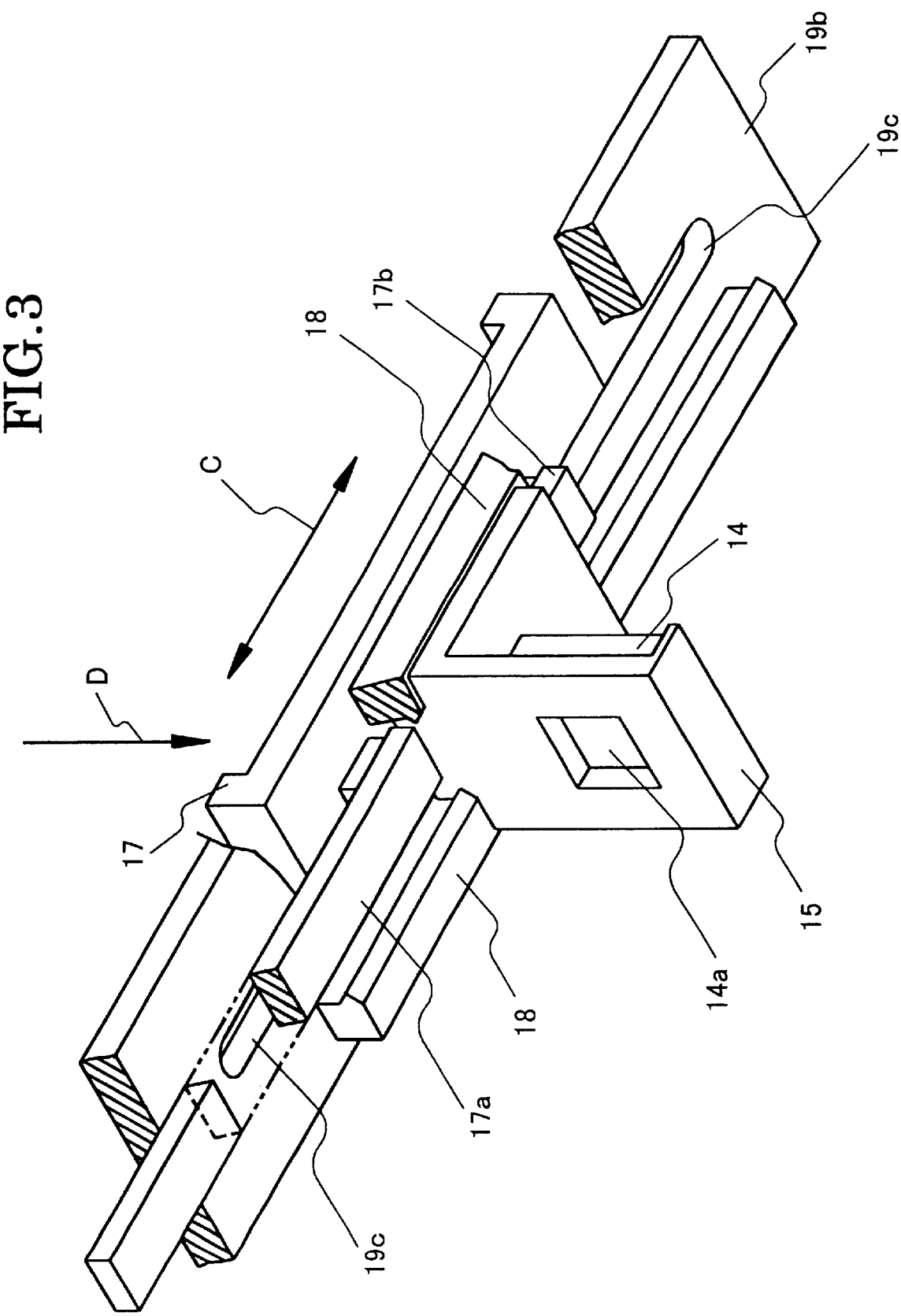
FIG. 3 is a view for describing the mechanism of moving the imaging element 14 inside the probe 19.

FIG. 3 is a view for describing the mechanism of moving the imaging element 14 inside the probe 19. Referring to the Figure, the slider 17 has hooks 17a and 17b, which are tied to the slider 17 and movable straight in unison therewith along the guide groove 19c which is formed in a base plate 19b.

The imaging element 14 is secured to the holder 15, which can be moved straight along the guide 18. More specifically, by manually causing sliding operation of the slider 17 back and forth as shown by arrow C, the holder 15 is moved on the optical axis of the probe 19 along the guide 18 by gaining drive force of straight movement from the hooks 17a and 17b of the slider 17. In this way, the position of the imaging face 14a of the imaging element 14 can be accurately adjusted to the focus position. Since the hooks 17a and 17b of the slider 17 are mechanically separated from the holder 15 and the guide 18, it is difficult for the stress as shown by arrow D, generated by manually moving the slider 17, to be applied to the holder 15, and stable straight movement can be ensured. The hooks 17a and 17b of the slider 17 have plate-like positions for preventing adverse effects of external scattered light entering through the guide groove 19c on the image. The optical connector 1a may be either a single-core optical connector or a multiple-core optical connector.

Figure 4:
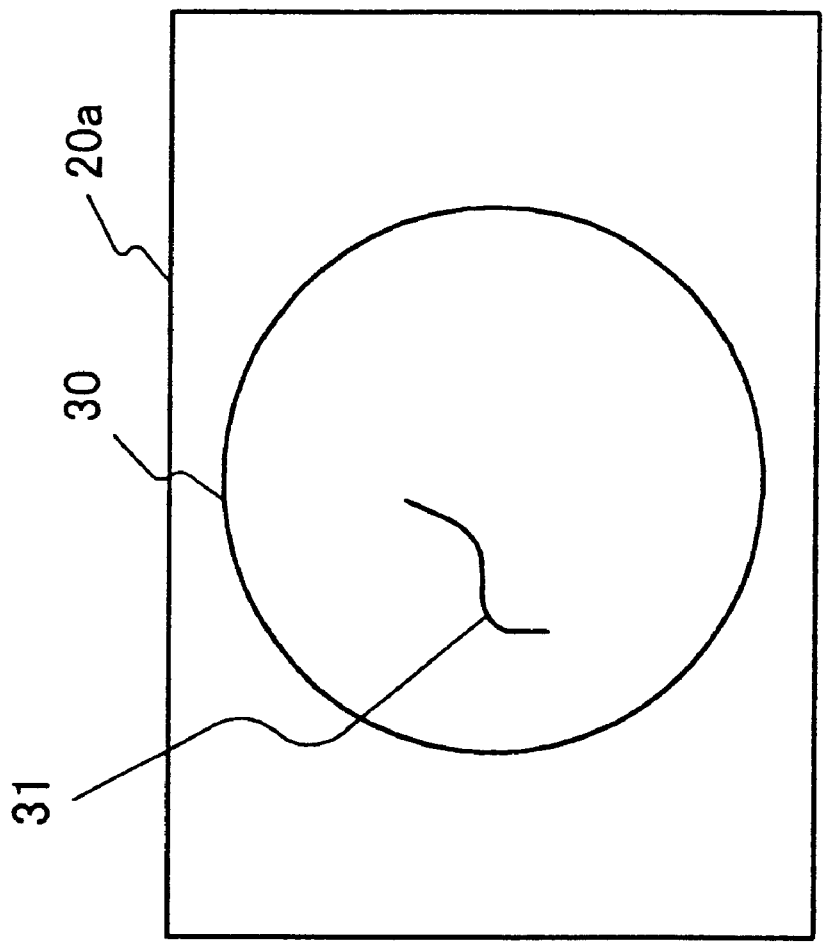
FIG. 4 is a view showing an example of display of the display screen 20a of the monitor unit 20.

FIG. 4 is a view showing an example of display of the display screen 20a of the monitor unit 20. Referring to the Figure, an image 30 of the coupling end face of the single-core optical connector 1a is displayed on the display screen 20a of the monitor unit 20. From this image 30, the state of the coupling end face of the optical connector 1a can be confirmed. The monitor display with the display screen 20a may use a liquid crystal device (LCD).

Any foreign matter or foreign article such as a yarn piece or any scar or scratch, present on the end face of the core portion, i.e., the coupling end face of the optical connector 1a, can be readily confirmed as an image 31 of the foreign matter or scar or scratch on the display screen 20a. Thus, in the optical transmission path it is possible to readily pin-point an optical connector, which is a cause of coupling loss increase due to presence of the foreign matter of foreign article such as a yarn piece or a scar or scratch.

FIGS. 5A and 5B show a different example of display as a modification of the example shown in FIG. 4. In this case, as shown in FIG. 5A, an image of the coupling end face of the multiple-core optical connector 1a is displayed on the display screen 20a of the monitor unit 20. As shown, it is possible to roughly confirm the state of the coupling end face of the optical connector 1a. As shown in FIG. 5B, of the displayed image 32 a portion of each core portion may be enlarged, and in this way it is possible to confirm foreign matter or foreign article such as a yarn piece or a scar or scratch present at the end face of the core portion. It is also possible to readily pin-point a core portion of the multi-core optical connector 1, on which the foreign matter or foreign article such as a yarn piece or a scar or scratch is present.

As has been described in the foregoing, according to the present invention the coupling end face of the optical connector is illuminated and enlargingly imaged, and the enlarged image thus obtained is monitored. Thus, it is possible to perfectly remove foreign matter from the coupling end of the optical connector by repeating an operation of repeating the cleaning of the coupling end face and confirming the state thereof. In addition, by confirming the coupling end face of the optical connector, it is possible to find scars and scratches on the core portion of the optical connector generated due to such causes as unsatisfactory handling of the optical connector. Furthermore, when such problem as coupling loss increase arises in the optical transmission path, it is possible to pin point an optical connector as the cause of the problem among a plurality of optical connectors by confirming the coupling end face thereof.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An optical connector state confirmation scope, said state confirmation scope comprising:

a probe for illuminating and magnifying a coupling end face of the optical connector;

an attachment for disposing the coupling end face on an optical axis of the probe and causing the coupling end face to be focused in a position inside the probe; and a monitor unit for monitoring an image of a state of a coupling end face obtained by said magnification.

2. The optical connector coupling end face state confirmation scope according to claim 1, wherein the attachment has a shape corresponding to the shape of an optical connector housing accommodating the optical connector.

3. The optical connector coupling end face state confirmation scope according to claim 1, wherein the attachment has a guide hole with the probe inserted therein, the guide hole being formed so as to fit the outer diameter of the probe.

4. The optical connector coupling end face state confirmation scope according to claim 1, wherein the distance between the coupling end face of the optical connector disposed in the attachment and an objective lens disposed inside the probe is set to a predetermined value such that the coupling end face of the optical connector is fixed in a position inside the probe.

5. The optical connector coupling end phase state confirmation scope according to claim 1, wherein the attachment is adapted to dispose the coupling end face inside the probe.

6. The optical connector coupling end face state confirmation scope according to claim 1, wherein the distance between the coupling end of the optical connector disposed at the attachment and an objective lens disposed inside the probe is set to a pre-determined value such that the coupling end-face of the optical connector is fixed in a position inside the probe and focused in a position inside the probe.

7. An optical connector state confirmation scope comprising:
   a probe for illuminating and magnifying a coupling end face of the optical connector, said probe including a light-emitting diode for illuminating the coupling end face and a half mirror for reflecting light emitted from the light-emitting diode at an angle of 90 degrees toward the coupling end face and transmitting light reflected by the coupling end face to have an image of the coupling end face be focused in a position within the probe;
   an attachment for disposing the coupling end face on an image of a state of the coupling end face obtained by magnification by the probe.

8. The optical connector state confirmation scope according to claim 7, wherein a light absorbing sheet is applied to an inner surface of the probe at a position wherein the light emitted from the light-emitting diode and transmitted through the half mirror is incident.

9. An optical connector state confirmation scope comprising:
   a probe for illuminating and magnifying a coupling end face of the optical connector, said probe including a holder, to which an imaging element for imaging the coupling end face is secured, a guide for guiding a straight movement of the holder for moving the imaging element along an optical axis of the probe and a slide for giving a drive fore to the holder for providing straight movement of the guide;
   an attachment for disposing the coupling end face on the optical axis of the probe and causing the coupling end face to be focused in a position inside the probe; and
   a monitor unit for monitoring the image of a state of the coupling end face of the optical connector obtained by magnification by the probe.

10. The optical connector state confirmation scope according to claim 9, wherein the slide has hook means for transmitting the drive force therethrough to the holder, the hook means being separated from the holder and the guide.

11. The optical connector state confirmation scope according to claim 9, wherein the hook means of the slide has a plate-like portion for preventing external scattered light from entering from a guide groove for guiding the straight movement of the slide.

12. The optical connector coupling end face state confirmation scope according to claim 9, wherein the distance between the coupling end of the optical connector disposed at the attachment and an objective lens disposed inside the probe is set to a pre-determined value such that the coupling end-face of the optical connector is fixed in a position inside the probe and focused in a position inside the probe.

13. An optical connector state confirmation apparatus comprising, means for illuminating and magnifying a coupling end face of the optical connector, and means for monitoring an image obtained by the magnification of the coupling end face.

14. An optical connector state confirmation method comprising the steps of:
   magnifying a coupling end face of the optical connector; and
   monitoring an image obtained by the magnification of the coupling end face.

15. An optical connector state confirmation scope, said state confirmation scope comprising:
   a probe for illuminating and magnifying a coupling end face of the optical connector;
   an attachment for disposing the coupling end face on an optical axis of the probe and causing the coupling end face to be focused in a position inside the probe; and
   a monitor unit for monitoring an image of the state of the coupling end face obtained by said magnification,
   wherein the coupling end face couples a single-core optical connector.

16. An optical connector state confirmation scope, said state confirmation scope comprising:
   a probe for illuminating and magnifying a coupling end face of the optical connector;
   an attachment for disposing the coupling end face on an optical axis of the probe and causing the coupling end face to be focused in a position inside the probe; and
   a monitor unit for monitoring an image of the state of the coupling end face obtained by said magnification,
   wherein the coupling end face couples a multiple-core optical connector.

* * * * *